B. DOUGLASS, Jr.
PNEUMATIC ANTISLIP DEVICE FOR POWER DRIVEN VEHICLES.
APPLICATION FILED JAN. 16, 1913.
1,057,044.
Patented Mar. 25, 1913.
2 SHEETS—SHEET 2.
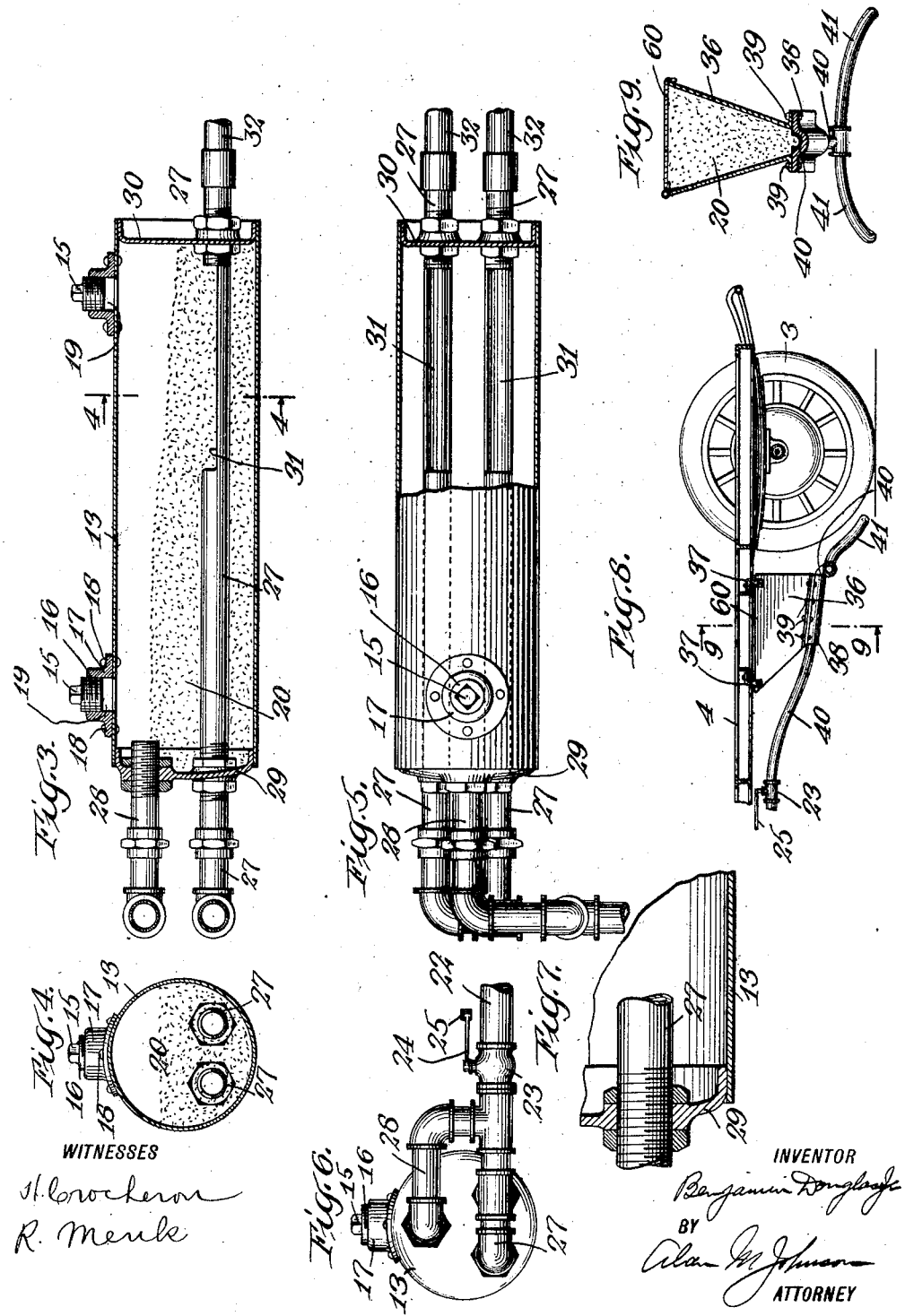
WITNESSES
INVENTOR
BY
ATTORNEY

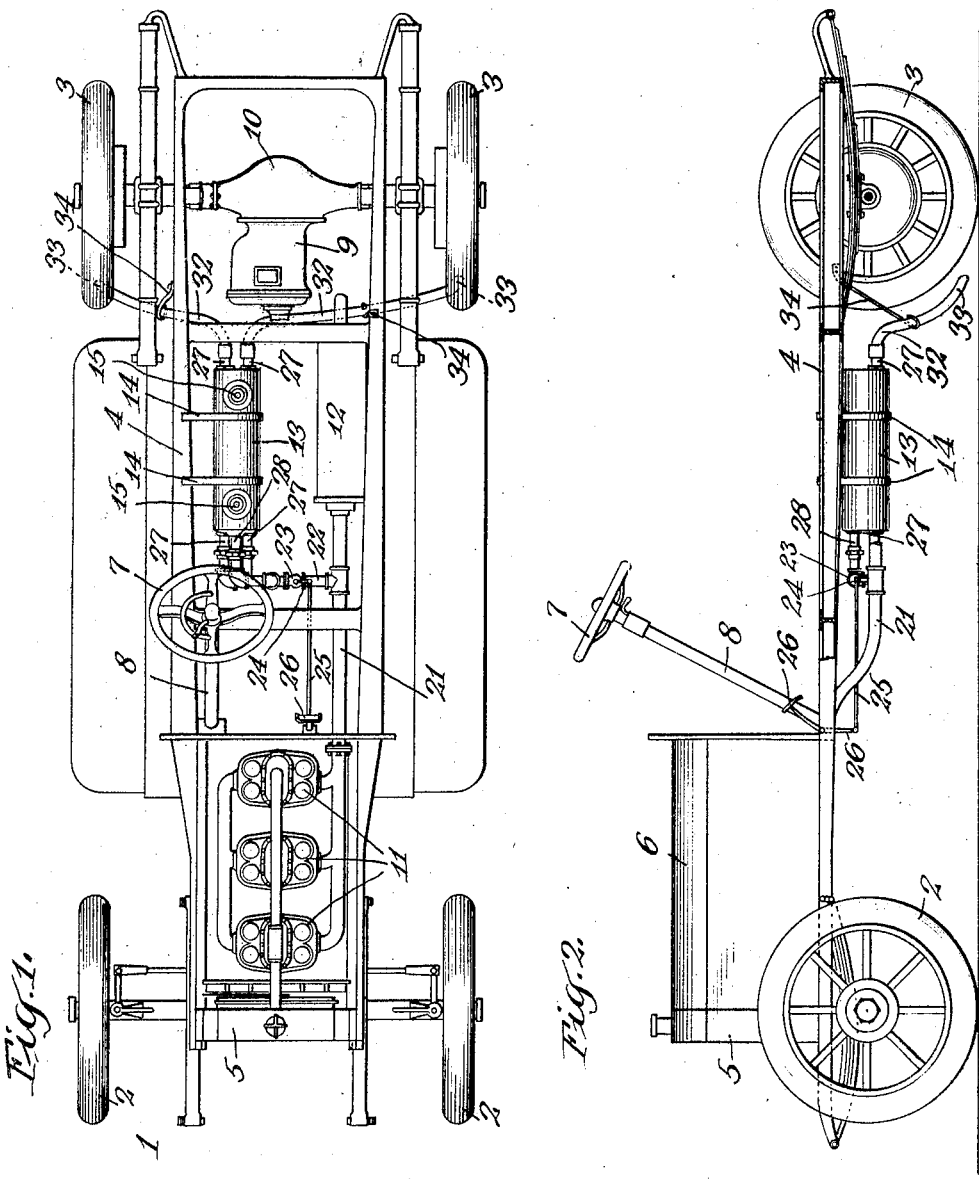

UNITED STATES PATENT OFFICE.

BENJAMIN DOUGLASS, JR., OF ORANGE, NEW JERSEY.

PNEUMATIC ANTISLIP DEVICE FOR POWER-DRIVEN VEHICLES.

1,057,044.  Specification of Letters Patent.  Patented Mar. 25, 1913.

Application filed January 16, 1913. Serial No. 742,321.

*To all whom it may concern:*

Be it known that I, BENJAMIN DOUGLASS, Jr., a citizen of the United States, and a resident of Llewellyn Park, Orange, in the county of Essex and State of New Jersey, have invented certain new and useful Improvements in Pneumatic Antislip Devices for Power-Driven Vehicles, of which the following is a specification, taken in connection with the accompanying drawings, which form a part of the same.

My invention relates to power driven vehicles and more particularly to pneumatic means to prevent the wheels of the vehicle slipping.

It further relates to using the exhaust from an explosion engine of a power driven vehicle to blow or distribute sand or other similar material in the path of one or more of the wheels of the vehicle.

When my invention is applied to automobiles it acts as an effective anti-skidding device in that the blast of sand extends not only immediately in front of the wheel, or wheels, but somewhat on either side forming a temporary mat which will prevent, not only the wheels moving around idly or slipping, but will also prevent the car from moving at an angle to its correct direction, or what is known as skidding.

My invention acts as a secondary muffler and substantially silences the gases which pass through it.

In the accompanying drawings, I have shown illustrative embodiments of my invention, though it is to be understood that my invention is not to be limited to the specific embodiments which I have shown by way of example. In these drawings the same reference numerals refer to similar parts in the several figures.

Figure 1 is a plan view of an automobile equipped with my invention, certain parts of the automobile being omitted for the purposes of clearer illustration; Fig. 2 is a side elevation, partly in vertical section, of the chassis of an automobile equipped with my invention; Fig. 3 is a vertical section through one form of container for sand or similar material; Fig. 4 is a transverse vertical section substantially on the line 4—4 of Fig. 3; Fig. 5 is a plan view partly broken away of the container and connections shown in Fig. 3; Fig. 6 is a detail view in end elevation; Fig. 7 is a sectional view of a detail; Fig. 8 is a fragmentary view of a chassis equipped with a modified form of container; Fig. 9 is a transverse vertical section through the container shown in Fig. 8 substantially on the line 9, 9.

In the illustrative embodiments of my invention shown in the drawings, 1 is an automobile having the usual front wheels 2, 2 and rear wheels 3, 3, chassis 4, radiator 5, hood 6, steering wheel 7, steering wheel post 8, transmission case 9, differential housing 10, engine 11 and muffler 12. All these elements form no part of my invention and are simply illustrated conventionally so that my invention may be more readily understood.

The preferred form of my invention consists in mounting the container, which is closed, upon the vehicle driven by an explosion engine and using the exhaust from the engine, suitably controlled, to force some of the sand or other material from the container to the roadway adjacent to the line of travel of one or more of the wheels. The force of the exhaust is preferably such that a sheet of sand, or similar material, is blown under and on either side of one or more wheels of the vehicle equipped with my invention and at the same time the exhaust is substantially silenced. In this manner in ordinary traveling over slippery roads, or taking hills, the sand immediately in front of the wheels would serve to give the tire, whether it be pneumatic, rubber, or of any other form, a better purchase and will prevent the wheels slipping in the direction of travel of the vehicle. This sheet of sand or similar material preferably extends on either side of the tread of the tire to prevent skidding and avoids the necessity of using anti-skidding chains on the tires which, as well known in the art, shortens the life of the tire, besides these chains are awkward and cumbersome to position upon the tire. When not in use these anti-skid chains are carried in bags and take up valuable storage space on the vehicle which by my invention can be used for other purposes. One means for accomplishing this result, though, of course, not the only one, is a closed cylindrical container 13 secured in any suitable manner to the chassis 4 by means of the supports 14, 14, Fig. 1. This container is provided with two plugs 15, 15 which have exterior screw threads 16 to coöperate with the threads in the thimble 17 secured to the container in any suitable manner as by the rivets 18, 18, Fig. 3. Through the openings 19, 19 controlled by these plugs 16, 16, the sand 20 or similar material is placed within the container, the plugs being then screwed to make a tight fit.

The engine exhaust pipe 21 is preferably tapped between the engine and the muffler 12 by a pipe 22 having a valve 23 controlled by a handle 24 which in turn is connected to a rod 25 connected at one end to the foot lever 26. To the other end of the pipe 22 I preferably connect three pipes 27, 27 and 28. The two former I preferably extend through the head 29 and out through the opposite head 30, a portion of these pipes being cut away at 31, 31 so that the sand, or similar material, will readily fall into them and be blown out through their connected curved pipes 32, 32, the ends 33, 33 of the latter pipes being brought down in front of the rear wheels 3, 3. The pipe 28 is preferably simply tapped into the head 29 and does not extend through the container 13 as do the other pipes.

It will be obvious that by pressing down upon the foot lever 26, the valve 23 will be operated through the connections 24 and 25, so that a portion of the exhaust gases from the engine 11 will be diverted from the muffler 12 and caused to pass through the container 13 and out through one or more connections and be exhausted, together with the sand which will be forced out from the container, beneath and on each side of the rear wheel, or rear wheels, if two connections such as 32, 32 are used which is the preferred construction. These connections are held to the chassis in any suitable way as by the supports 34, 34.

By using the particular form of pipes 27 and 28, I obtain a violent agitation of the sand within the container, though of course it is to be understood that my invention is not to be limited to this preferred form of container and connections.

I have shown in Figs. 8 and 9 of my drawing a modification in which a container 36 is shaped in the form of a hopper and secured to the chassis 4 by any suitable means such as by the clamps 37, 37. In this form of my invention the container has a bottom plate 38 which is riveted to the sides of the container by the rivets 39, 39 and is provided with a hinged cover 60. The valve 23 is the same as in the preceding form, and controls the by-pass or connection 40 from the muffler permitting a portion of the exhaust gases from the explosion engine to pass through the connection 40 and into the bottom of the container 36 and thence out through the extension 40, the flow of the gases and sand or similar material being divided or caused to pass through the two arms 41, 41 and be discharged beneath the two rear wheels of the vehicle.

Having thus described this invention in connection with illustrative embodiments thereof to the details of which I do not desire to be limited, what is claimed as new and what it is desired to secure by Letters Patent is set forth in the appended claims.

I claim—

1. The combination in an automobile of an explosion engine, an ordinary muffler, a secondary muffler comprising a closed receptacle normally partly filled with sand into which the exploded gases are discharged and substantially silenced, connections from the explosion engine to both the mufflers, and connections from the secondary muffler to convey the substantially silenced gases and some of the sand in front of and on either side of one or both of the driving wheels of the automobile.

2. The combination in an automobile of an explosion engine, an ordinary muffler, a second muffler comprising a closed receptacle normally partly filled with sand and provided with one or more slotted pipes extending through it, one end of which is connected to the connection from the engine and the other to the pipes which extend in front of one or both of the driving wheels.

3. The combination in an automobile of an explosion engine, an ordinary muffler, a secondary muffler comprising a closed receptacle normally partly filled with sand and provided with one or more slotted pipes extending through it, one pipe or pipes being connected with the exhaust from the explosion engine and the other ends of the pipes having connections extending into the path of one or both driving wheels, and a pipe from the engine exhaust extending simply through one end of the secondary muffler.

BENJAMIN DOUGLASS, Jr.

Witnesses:
John A. Davison,
Alan M. Johnson.